(12) United States Patent
Williamson

(10) Patent No.: US 6,190,545 B1
(45) Date of Patent: Feb. 20, 2001

(54) DRAINWATER TREATMENT SYSTEM FOR USE IN A HORIZONTAL PASSAGEWAY

(75) Inventor: J. Kelly Williamson, Hixson, TN (US)

(73) Assignee: Remedial Solutions, Inc., Hixson, TN (US)

( * ) Notice: Under 35 U.S.C. 154(b), the term of this patent shall be extended for 0 days.

(21) Appl. No.: 09/441,307

(22) Filed: Nov. 16, 1999

Related U.S. Application Data

(63) Continuation-in-part of application No. 09/053,431, filed on Apr. 1, 1998, now abandoned.

(51) Int. Cl.[7] .................................................. E03F 5/16
(52) U.S. Cl. ..................... 210/155; 210/259; 210/304; 210/305; 210/317; 210/320; 210/335; 210/484; 210/521; 210/924
(58) Field of Search ................................. 210/155, 259, 210/265, 266, 283, 284, 289, 304, 305, 317, 320, 335, 512.1, 521, 484, 924

(56) References Cited

U.S. PATENT DOCUMENTS

| | | | |
|---|---|---|---|
| 1,738,521 | * 12/1929 | Bomhoff | 210/265 |
| 4,689,145 | * 8/1987 | Mathews et al. | 210/170 |
| 4,906,381 | 3/1990 | Barbaro | 210/335 |
| 5,223,154 | 6/1993 | MacPherson, Jr. et al. | 210/163 |
| 5,507,944 | 4/1996 | Freidland et al. | 210/155 |
| 5,511,904 | 4/1996 | Van Egmond | 210/104 |
| 5,718,015 | * 2/1998 | Rohrbacher | 15/321 |
| 5,788,849 | 8/1998 | Hutter, Jr. et al. | 210/163 |
| 5,820,762 | 10/1998 | Bamer et al. | 210/163 |

OTHER PUBLICATIONS

Ad. literature—"Hydro–Kleen Filter Ststems", Bamcon Engineering Inc., Castro Valley, CA.
Ad. literature—Unit "H", Suntree Isles, Inc., Cape Canaveral, FL.

* cited by examiner

Primary Examiner—Matthew O. Savage
(74) Attorney, Agent, or Firm—Michael E. McKee

(57) ABSTRACT

A drainwater treatment system positionable within a horizontal flow passage of a drainage system utilizes a partition which divides the flow passage into an upstream chamber and a downstream chamber. In addition, a mid-panel is supported within the upstream chamber for dividing the interior of the upstream chamber into an upper section and a lower section so that the drainwater enters the upper section before entering the lower section through a first opening provided in the mid-panel. A conduit is also joined between a second opening provided in the mid-panel and the opening of the partition for conducting drainwater from the lower section of the upstream chamber to the downstream chamber so that the drainwater which enters the upper section and then into the lower section is decelerated to flow conditions at which debris and suspended are permitted to separate and settle from the drainwater before being conducted from the lower section and into the downstream chamber through the conduit. Furthermore, a series of filters are supported within the downstream chamber so that drainwater which flows into the downstream chamber from the upstream chamber flows in sequence through the series of filters before exiting the downstream chamber.

16 Claims, 3 Drawing Sheets

US 6,190,545 B1

DRAINWATER TREATMENT SYSTEM FOR USE IN A HORIZONTAL PASSAGEWAY

This application is a continuation-in-part of application Ser. No. 09/053,431 filed Apr. 1, 1998 and entitled DRAINWATER TREATMENT SYSTEM, now abandoned, the disclosure of which is incorporated herein by reference.

BACKGROUND OF THE INVENTION

This invention relates generally to the treatment of water which passes into the piping of a drainage system by way of a storm drain and relates, more particularly, to filtration systems through which drainwater is routed for purposes of filtering contaminants from the drainwater.

It is known that residue from oil and gasoline spills at service stations, parking lots or similar sites commonly remains at the site of the spill until it is washed away with water by way of a rainfall or a hose-cleaning operation. Of, course, as the residue and/or spilled material is washed to a drain, it is likely to be carried to and mixed with the water supply (e.g. lakes, etc.) from which drinkable water is taken. Similar problems and environmental concerns arise at alternative sites, such as in a leaching pool designed as a detention basin, for filtering, for example, wastewater, stormwater, free-phased organics, petroleum spills, nonpoint source discharge water, vehicle washdown wastewater, wastewater from secondary containment dikes, excavation and construction sites, underground storage tank removals, emergency response conditions, remote wash down areas, and captured water at stream crossings for timber cutting sites.

It is an object of the present invention to provide a new and improved means for filtering water which flows into a storm drain.

Another object of the present invention is to provide a new and improved drainwater treatment system which is positionable within a horizontal flow passage of a storm drain system and which provides an improvement upon the structure and filtration capabilities of the drainwater treatment systems of the prior art.

Still another object of the present invention is to provide such a treatment system which provides a relatively high exposure of drainwater to filter medium as drainwater flows through the treatment system.

Yet another object of the present invention is to provide such a system which is uncomplicated in construction and effective in operation.

SUMMARY OF THE INVENTION

This invention resides in a drainwater treatment system positionable within a horizontal flow passage of a drainage system having an upstream pipe portion having an outlet through which drainwater enters the horizontal flow passage and a downstream pipe portion having an inlet through which drainwater exits the horizontal flow passage.

The treatment system includes a partition supported within the horizontal flow passage between the upstream and downstream pipe portions for dividing the horizontal flow passage into an upstream chamber into which drainwater flows from the outlet of the upstream pipe portion and a downstream chamber from which drainwater flows into the inlet of the downstream pipe portion. In addition, the partition has an upper edge and an opening adjacent the upper edge through which the interior of the upstream chamber communicates with the interior of the downstream chamber.

Flow-channeling means including a mid-panel is supported within the upstream chamber for dividing the interior of the upstream chamber into an upper section and a lower section and which is disposed beneath the elevation of the outlet of the upstream pipe portion and the partition opening so that the drainwater which enters the upstream chamber from the outlet of the upstream pipe portion flows directly into the upper section of the upstream chamber. The mid-panel includes a first opening through which water is permitted to flow from the upper section to the lower section and also includes a second opening. Furthermore, a conduit is joined between the mid-panel and the partition which permits communication between the second opening of the mid-panel and the partition opening for conducting drainwater from the lower section of the upstream chamber to the downstream section when the level of the drainwater collected within the upstream compartment reaches the elevation of the partition opening so that the drainwater which enters the upper section from the upstream pipe portion and flows into the lower section by way of the flow-channeling means is decelerated to flow conditions at which debris and suspended solids are permitted to separate and settle from the drainwater before being conducted from the lower section and into the downstream chamber through the conduit. The system also includes at least one filter supported within the downstream chamber so that drainwater which flows into the downstream chamber from the upstream chamber and toward the inlet of the downstream pipe portion flows through the at least one filter before reaching the inlet of the downstream pipe portion.

DETAILED DESCRIPTION OF THE ILLUSTRATED EMBODIMENTS

Figure 1:
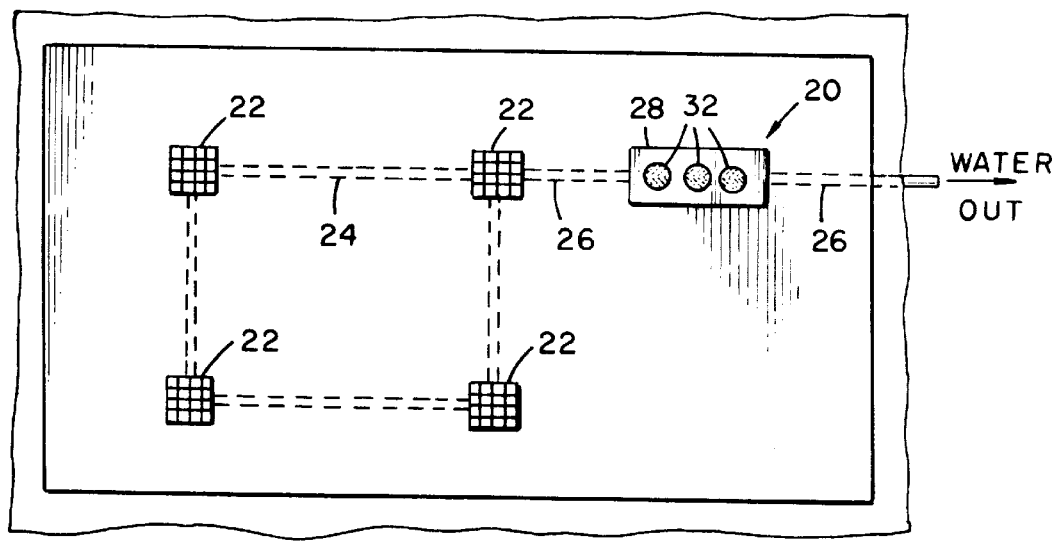
FIG. 1 is a plan view of an environment within which an embodiment of a drainwater treatment system is employed.

Turning now to the drawings in greater detail and considering first FIGS. 1–4, there is illustrated an embodiment, generally indicated 20, of a drainwater treatment system within which features of the present invention are embodied. The depicted system 20 is designed for use in an application, such as depicted in plan view in FIG. 1, wherein several surface drains 22, 22 are connected with appropriate (underground) drain piping 24 to accommodate the flow of drainwater from the several surface drains 22, 22 toward a single discharge point. The drain piping 24 includes a single convergence drain pipe 26 through which the drainwater flows from each of the surface drains 22, 22, and the system embodiment 20 is installed in this drain pipe 26.

Figure 2:
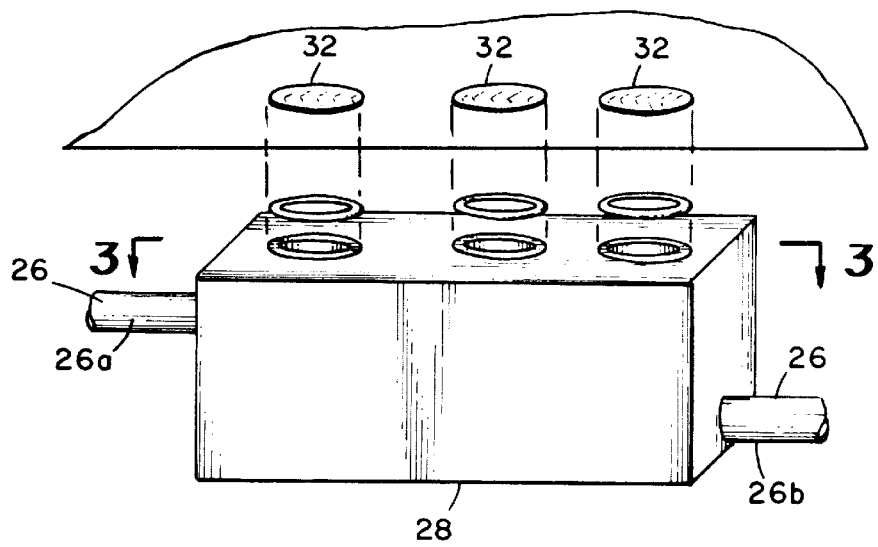
FIG. 2 is a perspective view of a fragment of the FIG. 1 system.

To this end and as best shown in FIG. 2, the drain pipe 26 is separated at a selected underground location, and a precast concrete, cavity-forming, box-like structure 28 for lining the interior of the underground location is installed at the underground location so that (the outlet of) the upstream portion, indicated 26a, of the separated pipe 26 protrudes through an end wall of the structure 28 at one end thereof and so that (the inlet of) the downstream portion, indicated 26b, protrudes through an end wall of the structure 28 at the opposite end thereof. The upstream pipe portion 26a of the depicted drain pipe 26 is disposed at a higher elevation than that of the downstream pipe portion 26b. Associated with the top of the structure 26 are three manway openings having covers 32, 32 providing access to the interior of the structure 28.

Figure 3:
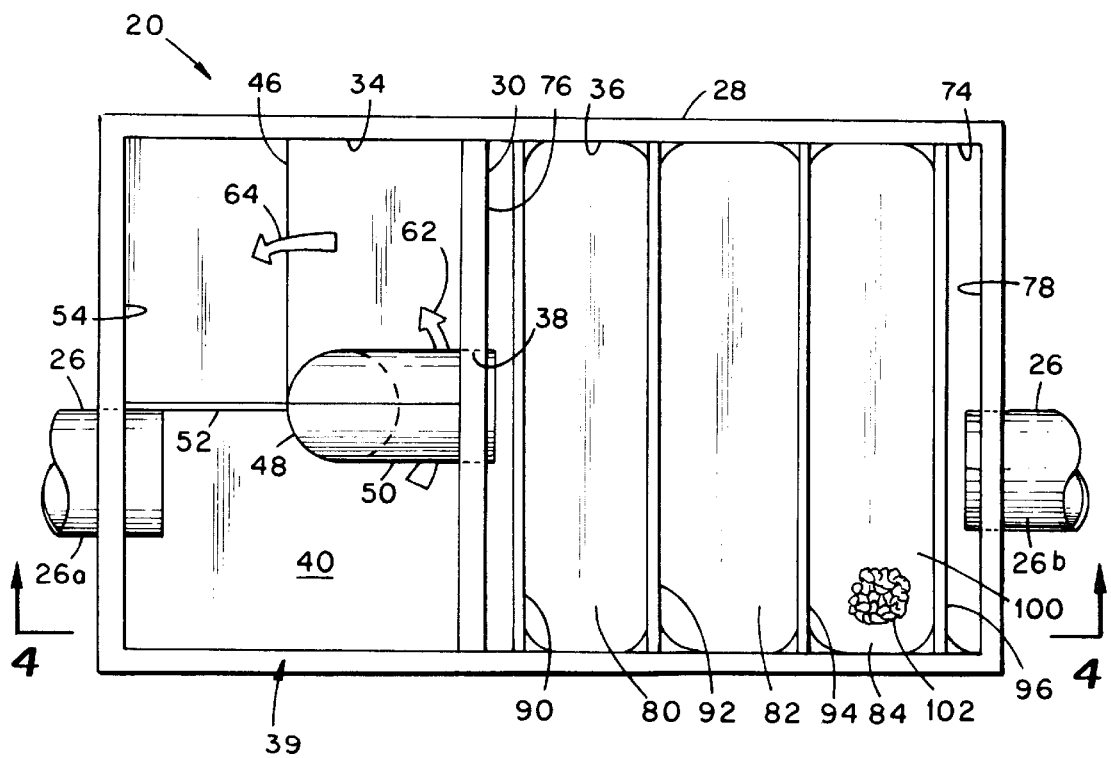
FIG. 3 is a cross-sectional view of the FIG. 1 system taken about along lines 3—3 of FIG. 2.
Figure 4:
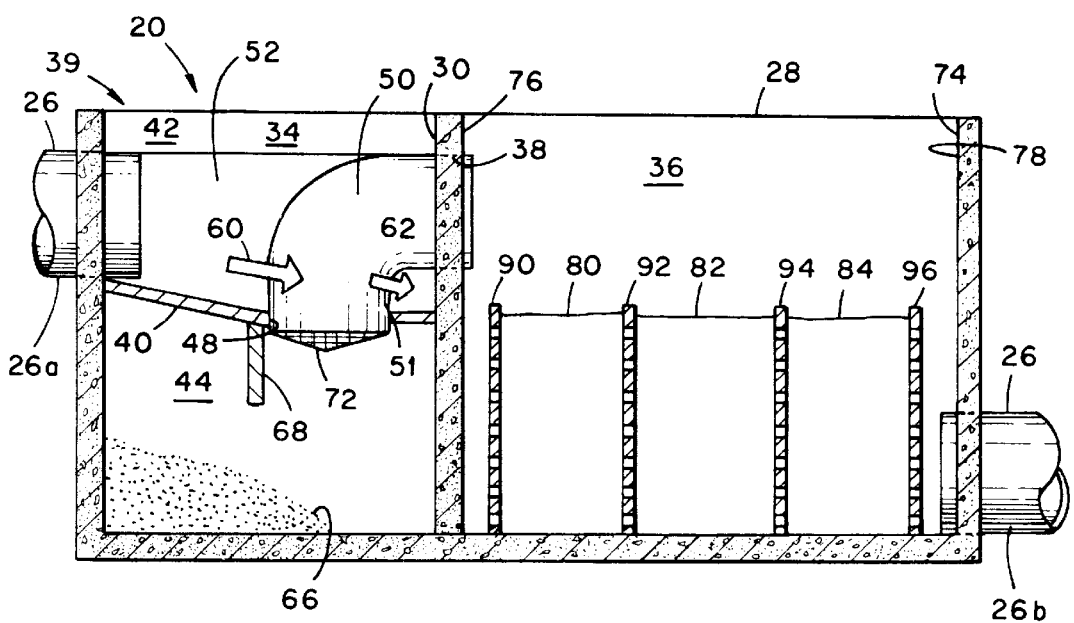
FIG. 4 is a cross-sectional view taken about along line 4—4 of FIG. 3.

As best shown in FIGS. 3 and 4, the system 20 includes a vertically-disposed (e.g. concrete) partition 30 which is supported within the structure 28 so as to divide the interior of the structure 28 into an upstream compartment 34 and a downstream compartment 36. Therefore, drainwater which enters the structure 28 by way of the drain pipe portion 26a flows into the upstream compartment 34 before entering the downstream compartment 36. The partition 30 also includes an elevated opening 38 adjacent its upper edge which is disposed at about the same elevation as the upstream pipe portion 26a and which, as will be apparent herein, permits drainwater to flow from the upstream compartment 34 to the downstream compartment 36 when the level of the drainwater which collects within the upstream compartment 34 rises to the elevation of the opening 38.

The system 20 also includes flow-channeling means, indicated generally 39, for decelerating the flow of drainwater entering the upstream compartment 341. The flow-channeling means 39 of the depicted system 20 includes a mid-panel 40, constructed for example of steel, which is supported within the upstream compartment 34 so as to divide, or separate, the upstream compartment 34 into an upper section 42 and a lower section 44. As best shown in FIG. 4, the mid-panel 40 is arranged in a canted relationship with respect to the horizontal and is disposed below the elevation of the outlet of the upstream portion 26a of the drain pipe 26 and the opening 38 of the partition 30. In addition and as best shown in FIG. 3, the mid-panel 40 is provided with an opening 46 at a corner of the upstream compartment 34 through which drainwater is permitted to flow into the lower section 44 from the upper section 42, and an additional opening 48 is defined in the mid-panel 40. The canted disposition of the mid-panel 40 relative to the horizontal helps to funnel the drainwater which falls onto the mid-panel 40 from the upstream pipe portion 26a toward the mid-panel opening 46.

An elbow-shaped (e.g. steel) conduit 50 is joined at one end to the mid-panel 40 so as to extend through the mid-panel opening 48 and is joined at its other end to the partition 30 so as to extend through the partition opening 38. An additional, vertically-disposed partition 52 (considered as an additional component of the flow-channeling means 39) is positioned within the upper section 34 so as to extend between one end wall, indicated 54, of the structure 28 and the walls of the conduit 50 to provide a barrier which prevents the flow of drainwater from the upper section 42 to the lower section 44 without passing beneath the crook of the conduit 50.

More specifically and as best shown in FIG. 4, the conduit 50 has a crook 51 which provides, with the upper surface of the mid-panel 40, a passageway through which drainwater is permitted to flow from one side of the upper section 34 to the opposite side thereof. Consequently, as drainwater enters the upper section 34 by way of the upstream portion 26a of the drain pipe 26 (which, as shown in FIG. 3, is offset from the center of the upstream compartment 34 and disposed to the side of the barrier partition 52 opposite the mid-panel opening 46) flows downwardly along the upper surface of the mid-panel 40 (e.g. along the FIG. 4 flow arrow 60) toward the partition 30 before flowing beneath the crook 51 of the conduit 50 (e.g. along the FIG. 4 flow arrow 62) and then downwardly through the mid-panel opening 46 into the lower section 44 (e.g. along the FIG. 3 flow arrow 64). Thus, the mid-panel 40, barrier partition 52, conduit 50 and partition 30 provide a relatively tortious, albeit circular, flow path for drainwater moving from the upper section 42 to the lower section 44 which decelerates the drainwater flow to flow conditions (i.e. relatively still conditions) at which debris and suspended solids, indicated 66 in FIG. 4, are permitted to separate from the drainwater and settle onto the bottom of the lower section 44. If desired, a cross beam 68 can be affixed against the underside of the mid-panel 40 to rigidify and add structural support to the mid-panel 40.

When the drainwater accumulates within the upstream compartment 34 to a level which rises to the elevation of the lower edge of the partition opening 38, the drainwater of the upstream compartment 34 flows from the lower section 44 and into the downstream compartment 36 through the conduit 50. It follows that the upstream compartment 34 acts as a deceleration/debris removal compartment within which water accumulates before flowing into the downstream compartment 36 by way of the conduit 50. If desired, the inlet end of the conduit 50 can be provided with a screen 72 (FIG. 4) which prevents the passage of large debris particles therethrough.

With reference still to FIGS. 3 and 4, the downstream compartment 36 provides an upwardly-opening filter-supporting receptacle 74 having two opposite ends 76, 78 through which drainwater is permitted to flow from the partition opening 38 to the downstream pipe portion 26b and within which a plurality of filters 80, 82 and 84 are positioned. The receptacle 74 (or downstream compartment 36) is of the same depth as the upstream compartment 34, and the filters 80, 82 and 84 are positioned in a series arrangement along the floor of the receptacle 74. To this end, there is provided within the receptacle 74 a plurality of vertically-disposed foramenous panels 90, 92, 94 and 96 which are joined to so as to extend laterally between the opposite sidewalls of the structure 28. Each panel 90, 92, 94 or 96 is constructed of steel and provides, with its adjacent panel 90, 92, 94 or 96 a filter-accepting compartment within which a corresponding filter 80, 82 or 84 is positionable. Consequently, the panels 90, 92, 94 and 96 provide support for the upstream-facing and downstream-facing ends of the filters 80, 82 and 84, and the openings provided in the foramenous panels 90, 92, 94 and 96 permit the drainwater to flow unobstructed in sequence through the filter 80, then through the filter 82 and then through the filter 84.

Each filter 80, 82 or 84 comprises an elongated, relatively flexible porous boom, or bag 100, and an amount of filter medium 102 is contained within the bag 100. Preferably, the bag 100 is constructed of a water-soluble material which disintegrates, or dissolves, when contacted by water so that soon after contact of the bag 100 with drainwater, the bag 100 cannot obstruct the flow of water through the filter-accepting compartments of the receptacle 74. Furthermore, the bag 100 is sized to be closely accepted by the filter-accepting compartments so that filter medium substantially fills the space between adjacent panels 90, 92, 94 and 96.

A filter medium 100 which is well-suited for use in the filters 80, 82 and 84 is a hydrophilic material manufactured from waste pulp available from Absorption Corp. of Bellingham, Wash. under the trade designation Absorbent W. The Absorption W product has been found to suitably absorb oil and grease, TSS, barium, chromium, and lead from drainwater routed through the receptacle 74. Basically, the Absorbent W product utilizes the natural capillary action of cellulose fiber to draw unwanted contaminants into the interior of the fiber. It will be understood, however, that the filter medium which is ultimately used in the system 20 can be selected based upon the contaminant desired to be filtered from the drainwater.

It follows that as drainwater enters the structure 28 by way of the upstream portion 26a of the drain pipe 26 flows into the upstream compartment 34 where its flow is decelerated and debris and suspended solids are permitted to settle onto the bottom of the upstream compartment 34 before entering the downstream compartment where the drainwater flows in sequence through the filters 80, 82, and 84 before exiting the downstream compartment 36 by way of the downstream portion 26b of the drain pipe 26. In practice, the first filter 80 in the sequence serves as a primary filter for filtering larger contaminant particles from the drainwater, while the subsequent filters 82 and 84 filter the smaller unwanted contaminants from the water.

Figure 5:
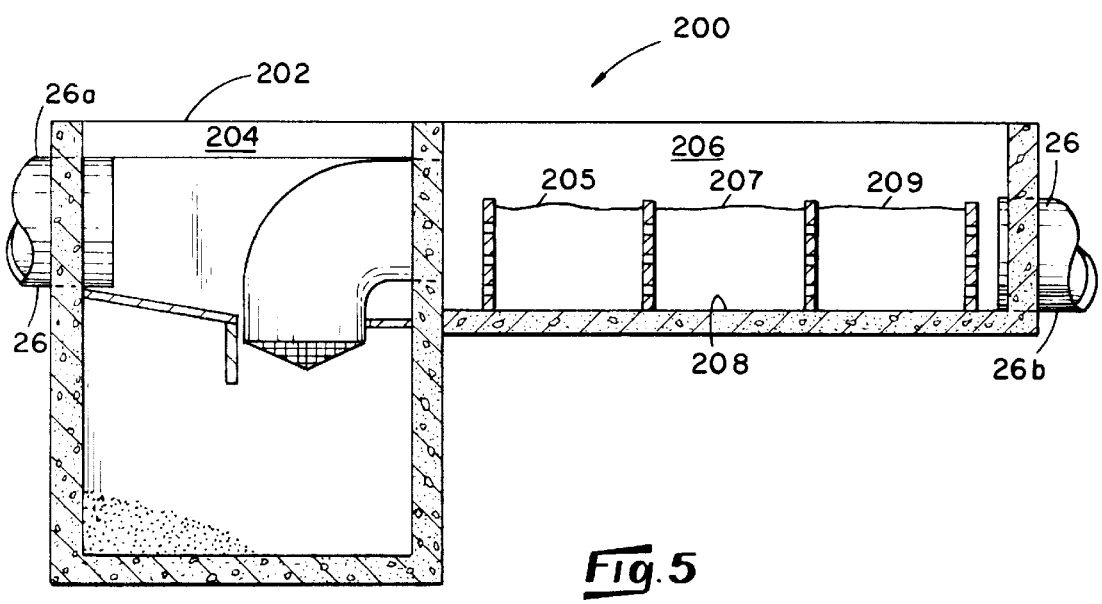
FIG. 5 is a cross-sectional view, similar to that of FIG. 4, of another embodiment of a treatment system.

Similarly, there is shown in FIG. 5 an alternative drainwater treatment system 200 for use in an environment utilizing a convergence drain pipe 26 whose upstream and downstream portions 26a and 26b which are aligned with one another. The depicted embodiment 200 includes a box-like structure 202 whose interior is divided into an upstream compartment 204 (for decelerating the drainwater flow and permitting debris to settle out of the drainwater) and a downstream compartment 206 within which a series of filters 205, 207, 209 are positioned. The upstream compartment 204 is comparable in design and construction to the upstream compartment 34 of the system 20 of FIGS. 1–4 but the downstream compartment 206 has a floor, indicated 208, which is disposed at a higher elevation than that of the floor of the upstream compartment 204. In particular, the floor 208 of the downstream compartment 204 is disposed slightly below the elevation of the downstream portion 26b of the drain pipe 26 so that the series of filters 205, 207 and 209 positioned in the downstream compartment 206 are disposed at about the same elevation as the downstream pipe portion 26b.

It follows from the foregoing that a drainwater treatment system has been described which provides a highly effective and economical means of pollution prevention by removing hazardous wastes and other regulated pollutants from stormwater runoff and wastewater discharges. Contaminated water enters the system where its flow is decelerated to near-still conditions, and the contaminants of concern are thereafter extracted in a unique, multi-stage filtering process using, as in the case of the Absorbent W filter medium, reclaimed materials. Moreover, the system is easily serviceable in that its filters can be readily installed or replaced when necessary through the manway openings 32.

Test Results

A series of field tests have been conducted with a drainwater treatment system within which filters containing the aforedescribed Absorbent W to demonstrate the effectiveness of the system and filter medium under intense field conditions. The site of the tests was at a convenience store and truck stop along a well-traveled interstate, and the system 100 was installed in a catch basin near the diesel fueling island which collects stormwater runoff and the wash down water from the surrounding 13,000 square foot area. The analytical data resulting from the test samplings show the discharge parameters in milligrams per liter for 1) the incoming water and 2) the outgoing water. The first tests showed a significant reduction in the levels of TSS (75.5%), oil and grease (98.1%), Barium (88.6%), Chromium (95.+ %), and Lead (85.2%). There was also a notable reduction in BOD (85.1%) and COD (21.1%) levels with only minor changes in pH, air and water temperature. In addition, the levels or Ammonia (as Nitrogen), and TKN were reduced 76.6% and 81.1%, respectively.

The second test (sampling) followed the first test (sampling) by one month, and approximately nine inches of rainfall and two surface spills totalling more than 20 gallons of diesel fuel (in addition to the normal activities and spills at a truck stop). The filters were not replaced between the first and second test samplings. As in the first test, there were significant reductions in the levels of oil and grease (97.9%) and Chromium (77.4%). There were also notable reductions in BOD (57.5%), COD (62.3%), Ammonia (77.4%), TKN (80.9%), Barium (64.4%) and TSS (16.2%). Air temperature, water temperature and pH remained constant during the testing event. It could therefore be concluded from these tests that even as the filters approach a condition at which they should be replaced, the system 100 continues to remove a significant amount of pollutants from the drainwater routed therethrough.

The third test (sampling) followed the second test (sampling) by about two weeks and followed the replacement of fresh filters. No rainfall was recorded for the period between the second and third tests. Consequently, the collected data yielded lower concentrations of contaminants for the incoming water. As before, the data showed reductions in the levels of oil and grease (49.2%) and TSS (76.0%), as well as significant reductions in BOD (56.8%), COD (63.5%), Ammonia (75.0%0, TKN (80.0%), Barium (55.0%), and Lead (44.3%). Air, water temperature and pH remained relatively constant during the testing event.

It will be understood that numerous modifications and substitutions can be had to the aforedescribed embodiment without departing from the spirit of the invention. For example, although the aforedescribed embodiments have been described for installation within storm drain systems having cavities and convergence pipes, an embodiment in accordance with the broader aspects of the invention can be designed for installation within alternative site-specific applications, such as in a leaching pool designed as a detention basin, for filtering, for example, wastewater, stormwater, free-phased organics, petroleum spills, nonpoint source discharge water, vehicle washdown wastewater, wastewater from secondary containment dikes, excavation and construction sites, underground storage tank removals, emergency response conditions, remote wash down areas, and captured water at stream crossings for timber cutting sites. Accordingly, the aforedescribed embodiment is intended for the purpose of illustration and not as limitation.

What is claimed is:

1. A drainwater treatment system positionable within a drainage system having an upstream pipe portion having an outlet through which drainwater enters the system and a downstream pipe portion having an inlet through which drainwater exits the system, the treatment system comprising: means for defining a horizontal flow passage;

a partition supported within the horizontal flow passage between the upstream and downstream pipe portions for dividing the horizontal flow passage into an upstream chamber into which drainwater flows from the outlet of the upstream pipe portion and a downstream chamber from which drainwater flows into the inlet of the downstream pipe portion, and the partition having an upper edge and an opening adjacent the upper edge through which the interior of the upstream chamber communicates with the interior of the downstream chamber;

flow-channeling means for decelerating the flow of drainwater which enters the upstream compartment including a mid-panel supported within the upstream chamber for dividing the interior of the upstream chamber into an upper section and a lower section and which is disposed beneath the elevation of the outlet of the upstream pipe portion and the partition opening so that the drainwater which enters the upstream chamber from the outlet of the upstream pipe portion flows directly into the upper section of the upstream chamber, and wherein the mid-panel provides a first opening through which water is permitted to flow from the upper section to the lower section and provides a second opening;

a conduit joined between the mid-panel and the partition permitting communication between the second opening of the mid-panel and the partition opening for conducting drainwater from the lower section of the upstream chamber to the downstream section when the level of the drainwater collected within the upstream compartment rises to the elevation of the partition opening so that the drainwater which enters the upper section from the upstream pipe portion and flows into the lower section by way of the flow-channeling means is decelerated to flow conditions at which debris and suspended solids are permitted to separate and settle from the drainwater before being conducted from the lower section and into the downstream chamber through the conduit; and at least one filter supported within the downstream chamber so that drainwater which flows into the downstream chamber from the upstream chamber and toward the inlet of the downstream pipe portion flows through the at least one filter before reaching the inlet of the downstream pipe portion.

2. The system as defined in claim 1 including a series of said filters supported within the downstream chamber wherein the series of filters includes a first filter and a second filter and further including filter supporting means disposed within the downstream chamber for supporting the first and second filters in registry with the expected flow path of drainwater flowing through the downstream portion so that drainwater which enters the downstream portion is directed through the first filter and then through the second filter before exiting the downstream chamber by way of the inlet of the downstream pipe portion.

3. The system as defined in claim 2 wherein the filter-supporting means is adapted to support the first and second filters in a horizontal, side-by-side relationship so that drainwater which flows through the downstream chamber flows through the first filter and then through the second filter.

4. The system as defined in claim 3 wherein each of the first and second filters includes an upstream side through which drainwater enters the filter and a downstream side through which drainwater exits the filter, and the filter-supporting means includes a foramenous partition bordering each of the upstream and downstream sides of the filters for providing lateral support to the filters while not obstructing the flow of drainwater through the filters.

5. The system as defined in claim 1 including a series of said filters supported within the downstream chamber and the system further includes filter-supporting means disposed within the downstream chamber for supporting the filters in the series of filters in registry with the expected flow path of drainwater flowing through the downstream portion so that the drainwater which enters the downstream portion and flows toward the inlet of the downstream pipe portion is directed in sequence through each filter in the series of filters.

6. The system as defined in claim 5 wherein each filter of the series of filters includes an upstream side through which drainwater enters the filter and a downstream side through which drainwater exits the filter, and the filter-supporting means includes a foramenous partition bordering each of the upstream and downstream sides of the filters for providing lateral support to the filters while not obstructing the flow of drainwater through the filters.

7. The system as defined in claim 1 wherein each filter in the series of filters is comprised of a hydrophobic material.

8. The system as defined in claim 1 wherein the mid-panel is supported in a canted relationship with respect to a horizontal axis of said flow channel for funneling the drainwater which falls upon the mid-panel toward the first opening of the mid-panel.

9. A drainwater treatment system for installation in an underground location of a drainage system having a upstream pipe portion which conducts drainwater to the underground location and a downstream pipe portion which conducts drainwater from the underground location, the system comprising:

an upwardly-opening box structure positionable within the underground location and connectable in series with the upstream and downstream pipe portions so that drainwater which flows out of the upstream pipe portion flows into one end of the structure and drainwater which enters the downstream pipe portion flows out of the other end of the structure, the structure having an interior and a bottom;

a partition supported within the structure for dividing the interior of the structure into an upstream chamber into which drainwater flows from the upstream pipe portion and a downstream chamber from which drainwater flows out of the structure by way of the downstream pipe portion, the partition having an upper edge and an opening adjacent the upper edge through which the interior of the upstream chamber communicates with the interior of the downstream chamber;

flow-channeling means for decelerating the flow of drainwater which enters the upstream compartment including a mid-panel supported within the upstream chamber for dividing the interior of the upstream chamber into an upper section and a lower section and disposed beneath the elevation of the upstream pipe portion and the partition opening so that drainwater which enters the upstream chamber through the drain pipe flows directly into the upper section of the upstream chamber, and wherein the mid-panel provides a first opening through which drainwater is permitted to flow from the upper section to the lower section and provides a second opening;

a conduit joined between the mid-panel and the partition permitting communication between the second opening of the mid-panel and the partition opening for conducting drainwater from the lower section of the upstream chamber to the downstream section when the level of the drainwater collected within the upstream compartment rises to the elevation of the partition opening so that the drainwater which enters the upper section from the upstream pipe portion and flows into the lower section is decelerated to flow conditions at which debris and suspended solids are permitted to separate and settle from the drainwater before being conducted from the lower section and into the downstream chamber through the conduit;

at least one filter supported within the downstream chamber so that drainwater which flows into the downstream chamber from the upstream chamber by way of the conduit flows through the at least one filter for filtering contaminants from the drainwater before flowing out of the structure by way of the downstream pipe portion.

10. The system as defined in claim 9 including a series of said filters supported within the downstream chamber wherein the series of filters includes a first filter and a second filter and further including filter supporting means disposed within the downstream chamber for supporting the first and second filters in registry with the expected flow path of drainwater flowing through the downstream portion so that drainwater which enters the downstream portion is directed through the first filter and then through the second filter before exiting the downstream chamber by way of the inlet of the downstream pipe portion.

11. The system as defined in claim 10 wherein the filter-supporting means is adapted to support the first and second filters in a horizontal, side-by-side relationship so that drainwater which flows through the downstream chamber flows through the first filter and then through the second filter.

12. The system as defined in claim 11 wherein each of the first and second filters includes an upstream side through which drainwater enters the filter and a downstream side through which drainwater exits the filter, and the filter-supporting means includes a foramenous partition bordering each of the upstream and downstream sides of the filters for providing lateral support to the filters while not obstructing the flow of drainwater through the filters.

13. The system as defined in claim 9 including a series of said filters supported within the downstream chamber and the system further includes filter-supporting means disposed within the downstream chamber for supporting the filters in the series of filters in registry with the expected flow path of drainwater flowing through the downstream portion so that the drainwater which enters the downstream portion and flows toward the inlet of the downstream pipe portion is directed in sequence through each filter in the series of filters.

14. The system as defined in claim 13 wherein each filter of the series of filters includes an upstream side through which drainwater enters the filter and a downstream side through which drainwater exits the filter, and the filter-supporting means includes a foramenous partition bordering each of the upstream and downstream sides of the filters for providing lateral support to the filters while not obstructing the flow of drainwater through the filters.

15. The system as defined in claim 9 wherein each filter in the series of filters is comprised of a hydrophobic material.

16. The system as defined in claim 9 wherein the mid-panel is supported in a canted relationship with respect to a horizontal axis of said box structure for funneling the drainwater which falls upon the mid-panel toward the first opening of the mid-panel.

* * * * *